Jan. 28, 1947.          W. A. FITCH          2,414,939
BEAM DEFLECTION CONTROL CIRCUIT
Filed Nov. 1, 1943
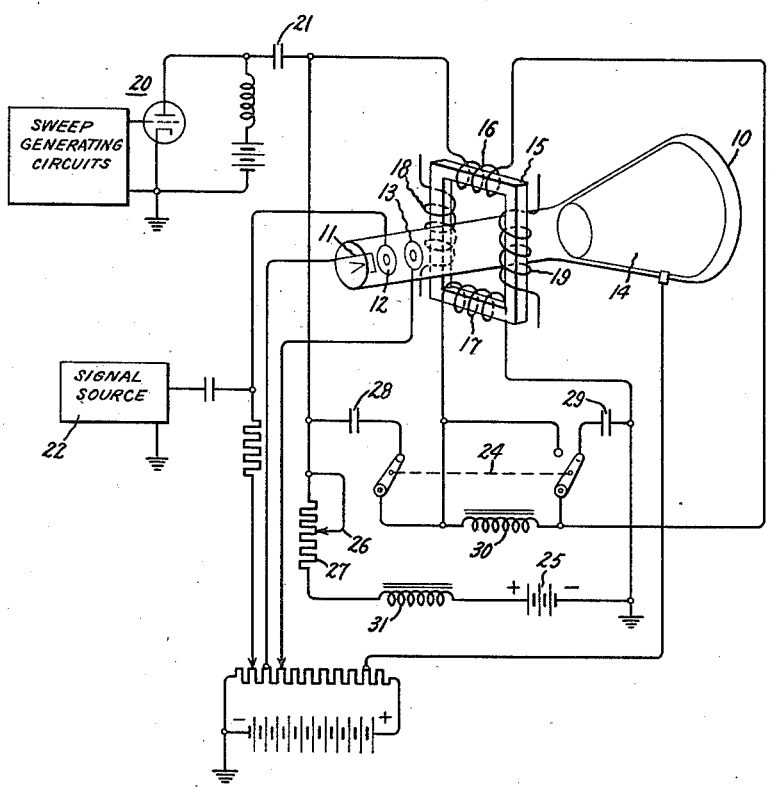
Inventor:
William A. Fitch,
by Harry E. Dunham
His Attorney.

Patented Jan. 28, 1947

2,414,939

UNITED STATES PATENT OFFICE 2,414,939

BEAM DEFLECTION CONTROL CIRCUIT

William A. Fitch, Schenectady, N. Y., assignor to General Electric Company, a corporation of New York Application November 1, 1943, Serial No. 508,631

3 Claims. (Cl. 315—27)

My invention relates to circuits including magnetic deflecting members for controlling the position and rate of deflection of the beams in cathode ray tubes.

When cathode ray tubes are employed to give a visual indication of a signal wave, it is desirable to provide an adjusting device for centering or adjusting the starting position of the beam on the fluorescent screen of the tube. In applications where it is desired selectively to represent any one of a plurality of different scales or ranges, it is necessary to impress a plurality of different sawtooth current waves on the sweep coils; these waves may have the same frequency or repetition rate but a different duration so that the beam will be swept across the screen of the tube at different rates to provide the different scales. Since different rates of change of current are necessary for the different scales, the resulting voltage across each of the sweep coils, which depends on the rate of change of current, differs accordingly.

It is an object of my invention to provide a cathode ray signal portraying apparatus having a plurality of sweep speeds and an improved arrangement for adjusting the circuit to compensate for differences in sweep speeds while maintaining the beam centering current unchanged.

The features of my invention which I believe to be novel are set forth with particularity in the appended claims. My invention itself, however, both as to its organization and method of operation together with further objects and advantages thereof may best be understood by reference to the following description taken in connection with the accompanying drawing the single figure of which represents diagrammatically a cathode ray signal portraying apparatus including a beam deflecting control circuit embodying my invention.

Referring now to the drawing, the apparatus includes a cathode ray electron discharge device or tube 10 having an electron gun comprising a cathode 11, a control electrode 12 and a first anode 13 for producing an electron beam. The tube also includes a second or high voltage anode which may comprise the usual metallic coating on the inner surface of the glass envelope as indicated at 14. In order to deflect the cathode ray beam and portray the signal on the fluorescent screen of the tube there is provided a magnetic type deflecting member comprising a magnetic core 15 and four coils 16, 17, 18, and 19 connected about the yoke and having their axes spaced apart by 90 degrees. The apparatus illustrated may be arranged, for example, so that the beam is swept from the bottom to the top of the fluorescent screen to make a vertical trace and so that the position of the vertical trace may be varied gradually from one side of the screen to the other. A signal impressed upon the cathode ray screen from a signal source such as indicated at 22 coupled to the control grid 12 provides a bright spot on the trace and a vertical position of the spot may, for example, indicate the range of a distant object and the lateral position of the trace on the screen may be made to correspond to the direction of the object. The coils of the yoke are connected in pairs, the coils 16 and 17 being employed to sweep the beam vertically at a selected sweep rate and the coils 18 and 19 being employed to deflect the beam from one side of the screen to the other. The particular apparatus and connections for supplying the deflection currents for the coils 18 and 19, which determine the lateral position of the vertical sweep line on the screen, form no part of the present invention and have been omitted from the drawing. In order to accomplish the vertical deflection of the electron beam so that it moves linearly with respect to time from the bottom of the fluorescent screen to the top a sawtooth current wave is passed through the coils 16 and 17, the current increasing at a constant rate to move the beam from the bottom of the fluorescent screen to the top and then decreasing rapidly to restore the beam to its starting position. It is readily apparent that by changing the rate of increasing current strength the rate at which the beam traverses the fluorescent screen is changed, so that by selecting a plurality of different sawtooth waves a plurality of different sweep speeds may be represented on the cathode ray screen. Sawtooth current waves for providing the several different scales may be obtained from a suitable sweep generating apparatus indicated generally at 20 and coupled to the deflection coils through a condenser 21. The coils 16 and 17 are arranged so that they may be connected either in series or in parallel with respect to the alternating sawtooth deflection wave, this being accomplished by operation of a two-pole switch 24 which in its right-hand position as illustrated connects the coils in parallel in the alternating current circuit and in its left-hand position connects the coils in series in the alternating current circuit. In order to center the electron beam, that is, in order to determine its starting position at the bottom of the screen, direct current is passed through the coils 16 and 17 from a suitable source such as a battery 25. The amount of centering current may be adjusted by varying a slide 26 on the variable resistance 27. A switch 24 is arranged so that regardless of its position the direct current flows through the coils in series.

When the switch 24 is in its right-hand position as shown in the drawing, the sawtooth current wave flows through the coils 16 and 17 in parallel to ground, the coil 17 being connected to the condenser 21 through a condenser 28 and the left-hand pole of the switch 24, the coil 16 being connected between the condenser 21 and ground through the right-hand pole of the switch 24 and a condenser 29. The direct current flows through the coil 16 and choke coil 30 and returns to the source 25 through the coil 17. The purpose of the choke coil 30 is to prevent the passage of the alternating current deflection wave through the coils 16 and 17 in series when the switch 24 is in its right-hand position. A second choke 31 is provided in series with the source 25 to prevent the passage of the deflection current wave through the source 25 to ground thereby preventing short circuiting of the coils 16 and 17.

When the switch 24 is moved to its left-hand position the condensers 28 and 29 are cut out of the circuit and coils 16 and 17 are connected in series both in the alternating current circuit and in the direct current circuit, it being evident that the right-hand pole of the switch short circuits the choke 30 so that the alternating current flows from the coil 16 through the coil 17 to ground through the same path as the direct current for centering the beam.

Since the voltage induced in the coils 16 and 17 by the sawtooth current wave depends upon the rate of change of the current, a wave having short duration will induce a higher voltage than a wave having longer duration for the same angle of beam deflection. It is, therefore, apparent that by providing an arrangement for changing the coils 16 and 17 from series to parallel the voltage across the coils may be made more nearly the same for the two rates of deflection so that by connecting the coils in series during the low rate of deflection the sum of the voltages of the two coils will be of the same order as the voltage across the two coils in parallel when the higher rate of change of current prevails.

From the foregoing it is readily apparent that I have provided a simple and effective arrangement for changing the deflecting coils from series to parallel in the alternating current circuit without changing the connection in the direct current circuit, the change being made by the operation of a single switch element.

While I have illustrated a particular form of my invention, other modifications may occur to those skilled in the art. I do not, therefore, desire my invention to be limited to the particular circuit illustrated and described and I intend in the appended claims to cover all modifications which fall within the spirit and scope of my invention.

What I claim as new and desire to secure by Letters Patent of the United States, is:

1. A cathode ray signal portraying apparatus comprising a cathode ray tube having an electron gun for producing a cathode ray beam, a beam deflecting member of the magnetic type having a pair of coils and positioned for deflecting the beam in said tube, means including a circuit for supplying a beam deflecting current wave to said coils, switching means for connecting said coils selectively to conduct the deflecting current in series or in parallel, means providing a direct current circuit including said coils for adjusting the starting point of the beam, said circuits being connected and arranged so that said coils remain in the same relation in said direct current circuit regardless of whether they are connected in series or in parallel in said deflecting wave circuit.

2. A cathode ray signal portraying apparatus comprising a cathode ray tube having an electron gun for producing a cathode ray beam, a beam deflecting member of the magnetic type having a pair of deflecting coils and positioned for deflecting the beam in said tube, a deflecting current wave source, a source of direct current, a choke coil, means for connecting said deflecting coils in series across said wave source and across said direct current source, and switching means for connecting said deflecting coils in parallel across said wave source while maintaining them in series across said direct current source and for introducing said choke coil in the circuit of said deflecting coils in series whereby the deflecting current flows through said deflecting coils in parallel and the direct current flows through said deflecting coils in series, said switching means including condensers associated therewith for confining the passage of direct current to the series path through said deflecting coils.

3. A cathode ray signal portraying apparatus comprising a cathode ray tube having an electron gun for producing a cathode ray beam, a beam deflecting member of the magnetic type having a pair of coils and positioned to deflect the beam in said tube, a deflection current wave source, a direct current source, a pair of condensers, a choke coil, switching means selectively operable in a first position to connect said pair of coils in series across both said sources and in a second position to connect said pair of coils in series with said choke coil across said direct current source and in parallel paths across said wave source each of said parallel paths including one of said condensers in series with a respective coil of said pair of coils, whereby in said second position of said means direct current is prevented from passing through said coils in parallel and the deflection current wave is prevented from passing through said coils in series, and a choke coil in series with said direct current source for preventing the passage of current therethrough from said wave source.

WILLIAM A. FITCH.